J. Earnshaw,
Flour Sieve.
N° 48,916.  Patented July 25, 1865.

Witnesses:
Theo Tusch
W<sup>m</sup> Trewin

Inventor:
John Earnshaw
per Munn & Co
Attorneys

UNITED STATES PATENT OFFICE.

JOHN EARNSHAW, OF LOWELL, MASSACHUSETTS.

FLOUR-SIFTER.

Specification forming part of Letters Patent No. 48,916, dated July 25, 1865.

*To all whom it may concern:*

Be it known that I, JOHN EARNSHAW, of Lowell, in the county of Middlesex and State of Massachusetts, have invented a new and Improved Device for Sifting Flour and Meal; and I do hereby declare that the following is a full, clear, and exact description thereof, which will enable others skilled in the art to make and use the same, reference being had to the accompanying drawings, forming part of this specification, in which—

Figure 1:
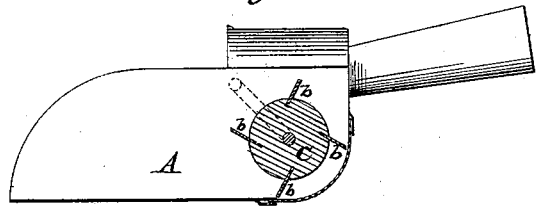
Figure 2:
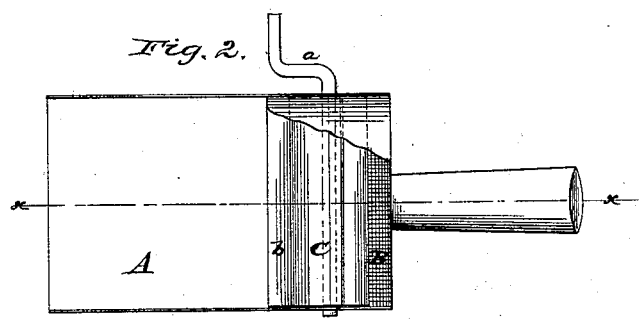
Figure 3:
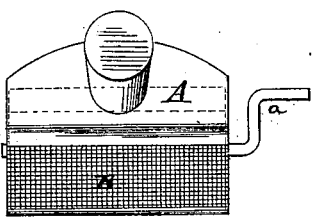

Figure 1 is a longitudinal section of my invention, taken in the plane of the line $x\ x$, Fig. 2. Fig. 2 is a top view of the same, with nearly all of the top guard or cover of the scoop broken away to show the position of the device used for forcing the flour or meal through the sieve; and Fig. 3 is an end view of the same.

The object of my invention is to provide a handy and easily-operated device for sifting meal or flour; and it consists in the employment or use, in a scoop having a portion of its rear part made of wire-gauze, of a roller having wings arranged on its surface and parallel with its length, or of any other mechanical device, for forcing, by rubbing or scraping, the meal or flour through the meshes of the sieve.

To enable others to understand my invention, I will proceed to describe it.

A represents a scoop, made of metal or other material, such as is ordinarily used in stores or other places for dipping flour, meal, sugar, &c. The rear portion of the scoop is cut out and a piece of wire-gauze, B, inserted in its place to form a sieve through which to force or sift the meal or flour.

C is a roller or shaft, having its bearings in the side plates of the sieve, and having a crank, $a$, extending out from one side, by which to revolve it. On the surface of the said roller or shaft C, and parallel with the length thereof, a series of wings, $b$, are arranged, said wings $b$ being composed of india-rubber, leather, or any other suitable material, and of a depth sufficient to scrape or bear upon the sieve as they are revolved.

From the above brief description it will be seen that my sifter may be filled with flour or meal by merely scooping up the desired quantity, and that by holding it at such an angle as will bring its sieve portion over the bowl or dish into which the meal or flour is to be sifted the meal or flour will be forced through the meshes of the sieve by the wings as they are revolved by the crank attached to the shaft or roller for that purpose.

My sifter will be found to be a decided improvement on all hand-sieves as now constructed. It is a handier article, and it sifts the meal or flour more expeditiously and with less labor, and there is no liability of scattering the meal or flour over the sides of the article into which it is being sifted, as the sieve portion can be held directly over such article, and the flour forced through it quickly and in a manner which precludes the possibility of waste.

What I claim as my invention, and desire to secure by Letters Patent, is—

The combination of a sifting device with a flour or meal scoop, substantially as set forth.

JOHN EARNSHAW.

Witnesses:
JOSEPH HARRISON,
JNO. W. JONES.